US012604293B2

(12) United States Patent
Dong

(10) Patent No.: US 12,604,293 B2
(45) Date of Patent: Apr. 14, 2026

(54) INFORMATION PROCESSING METHOD

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 858 days.

(21) Appl. No.: 17/911,371

(22) PCT Filed: Mar. 13, 2020

(86) PCT No.: PCT/CN2020/079350

§ 371 (c)(1),
(2) Date: Feb. 24, 2023

(87) PCT Pub. No.: WO2021/179323

PCT Pub. Date: Sep. 16, 2021

(65) Prior Publication Data

US 2023/0189198 A1 Jun. 15, 2023

(51) Int. Cl.
*H04W 64/00* (2009.01)
*H04W 68/00* (2009.01)

(52) U.S. Cl.
CPC ......... *H04W 64/00* (2013.01); *H04W 68/005* (2013.01)

(58) Field of Classification Search
CPC . H04W 64/00; H04W 68/005; H04W 64/003; H04W 76/27; Y02D 30/70
See application file for complete search history.

(56) References Cited

U.S. PATENT DOCUMENTS

| | | | | |
|---|---|---|---|---|
| 10,433,275 | B2 | 10/2019 | Edge et al. | |
| 2018/0343635 | A1 | 11/2018 | Edge et al. | |
| 2019/0116486 | A1 | 4/2019 | Kim et al. | |
| 2019/0230619 | A1* | 7/2019 | Cui | H04W 64/00 |
| 2019/0239188 | A1* | 8/2019 | Wang | H04W 68/005 |
| 2019/0373573 | A1 | 12/2019 | Cui et al. | |
| 2020/0029237 | A1* | 1/2020 | Kim | H04W 68/02 |
| 2020/0037283 | A1 | 1/2020 | Edge et al. | |
| 2020/0059885 | A1* | 2/2020 | Johansson | H04W 48/20 |
| 2020/0154393 | A1* | 5/2020 | Höglund | H04W 68/02 |

(Continued)

FOREIGN PATENT DOCUMENTS

| | | | |
|---|---|---|---|
| CN | 102860062 | A | 1/2013 |
| CN | 106535319 | A | 3/2017 |

(Continued)

OTHER PUBLICATIONS

Huawei, HiSilicon, "TS 23.501: Location report procedure for UE in RRC inactive mode," SA WG2 Meeting #122Bis, S2-175848, Sophia Antipolis, France, Aug. 21-25, 2017, (5p).

(Continued)

*Primary Examiner* — Dhaval V Patel
(74) *Attorney, Agent, or Firm* — Arch & Lake LLP; Hao Tan; Shen Wang

(57) ABSTRACT

An information processing method applied to a first base station anchored by a UE is provided. The method includes: broadcasting, in response to receiving a positioning request message, a first paging message carrying the positioning request message, where the UE is in an RRC disconnected state, and the positioning request message is configured to request a positioning result of the UE.

20 Claims, 9 Drawing Sheets

(56) References Cited

U.S. PATENT DOCUMENTS

| | | | | |
|---|---|---|---|---|
| 2020/0196298 | A1* | 6/2020 | Edge | G01S 5/0036 |
| 2020/0358576 | A1* | 11/2020 | Zarifi | H04L 5/0051 |

FOREIGN PATENT DOCUMENTS

| | | | |
|---|---|---|---|
| CN | 107645753 | A | 1/2018 |
| CN | 108141700 | A | 6/2018 |
| CN | 108713337 | A | 10/2018 |
| CN | 109076491 | A | 12/2018 |
| CN | 109327903 | A | 2/2019 |
| CN | 109819392 | A | 5/2019 |
| CN | 110651511 | A | 1/2020 |
| CN | 110651512 | A | 1/2020 |
| CN | 110858951 | A | 3/2020 |
| WO | 2018040039 | A1 | 3/2018 |
| WO | 2018062907 | A1 | 4/2018 |

OTHER PUBLICATIONS

Huawei, Hisilicon, "UE location report to the SMF by RAN in RRC Inactive State," 3GPP TSG-SA2 Meeting #128, S2-186844, Vilnius, Lithuania, Jul. 2-6, 2018, (4p).

International Search Report issued in Application No. PCT/CN2020/079350 dated Dec. 16, 2020, (4p).

* cited by examiner

INFORMATION PROCESSING METHOD

CROSS REFERENCE TO RELATED APPLICATION

The present application is the U.S. National Stage of International Application No. PCT/CN2020/079350 filed on Mar. 13, 2020, the contents of which are incorporated herein by reference in their entireties for all purposes.

BACKGROUND

The fifth generation cellular mobile communication ($5^{th}$ Generation, 5G) R16 has introduced a variety of positioning technologies, and can realize positioning of user equipment (UE) in a Radio Resource Control (RRC) connected state. For some of positioning technologies, a Location Management Function (LMF) needs to provide the UE with positioning assistance information. The LMF here is a communication entity.

In order to save energy consumption of the UE and reduce positioning delay, 5G proposes a requirement for positioning UE in an RRC idle state and an RRC inactive state.

SUMMARY

The present disclosure relates to but is not limited to the technical field of wireless communication, in particular to an information processing method.

Examples of the present disclosure provide an information processing method.

A first aspect of the present disclosure provides an information processing method, applied to a first base station anchored by a UE, and including:

broadcasting, in response to receiving a positioning request message, a first paging message carrying the positioning request message.

The UE is in an RRC disconnected state, and the positioning request message is configured to request a positioning result of the UE.

A second aspect of the present disclosure provides an information processing method, applied to a second base station in a Radio Access Network based Notification Area (RNA) of a UE. The second base station is different from a first base station anchored by the UE, and the method includes:

receiving triggering information sent by the first base station, where the triggering information may include: a first paging message carrying a positioning request message of LMF, or the positioning request message and a second paging message not carrying the positioning request message; and broadcasting the first paging message based on the triggering information, the first paging message is configured to trigger the UE to perform positioning measurement and obtain a positioning result to be reported to the LMF.

A third aspect of the present disclosure provides an information processing method, applied to a UE, and including:

performing, in response to receiving a first paging message carrying a positioning request message, positioning measurement; and reporting a positioning result of the positioning measurement.

It may be understood that both the foregoing general description and the following detailed description are merely examples and illustrative, without any limitation to the examples of the disclosure.

BRIEF DESCRIPTION OF THE DRAWINGS

The accompanying drawings, which are incorporated in and constitute a part of this specification, illustrate examples consistent with the disclosure, and together with the description serve to explain the principles of the examples of the disclosure.

DETAILED DESCRIPTION

For the UE in the RRC connected state, since the LMF can determine a serving cell of the UE, the LMF sends the positioning assistance information to the UE through a Long Term Evolution Position Protocol (LPP) message. Specifically, a serving base station of the UE sends the positioning assistance information to the UE through an RRC message in an unvarnished transmission manner. In addition, the LMF may send the positioning assistance information to the base station through a New Radio Positioning Protocol a (NRPPa) message, and then the base station sends the information to the UE in a broadcast manner through a system message.

For the UE in the RRC idle state and the RRC inactive state, the LMF cannot send the positioning assistance information to the UE through the LPP message. In order to send the positioning assistance information to the UE in the RRC idle state or the RRC inactive state, not only the system overhead will be increased, but also the positioning delay will be brought.

Examples will be described in detail herein, instances of which are illustrated in the accompanying drawings. When the following description refers to the accompanying drawings, the same numerals in different accompanying drawings refer to the same or similar elements unless otherwise indicated. The implementations described in the following examples do not represent all implementations consistent with examples of the disclosure. Rather, they are merely instances of apparatus and methods consistent with some aspects of the examples of the disclosure as recited in the appended claims.

Terms used in the examples of the disclosure are for the purpose of describing particular examples merely, and are not intended to limit the examples of the disclosure. Singular forms "a", "the", and "said" used in the examples of the disclosure and the appended claims are intended to include plural forms as well, unless the context clearly dictates otherwise. It may also be understood that the term "and/or" used herein refers to and includes any and all possible combinations of one or more associated listed items.

It may be understood that although the terms first, second, third, etc. may be used in examples of the disclosure to describe various information, and such information should not be limited to these terms. These terms are merely used to distinguish the same type of information from each other. For instance, without departing from the scope of the examples of the disclosure, first information may also be referred to as second information, and similarly, the second information may also be referred to as the first information. Depending on the context, the word "if" used herein can be interpreted as "at the time of" or "when" or "in response to determining".

Figure 1:
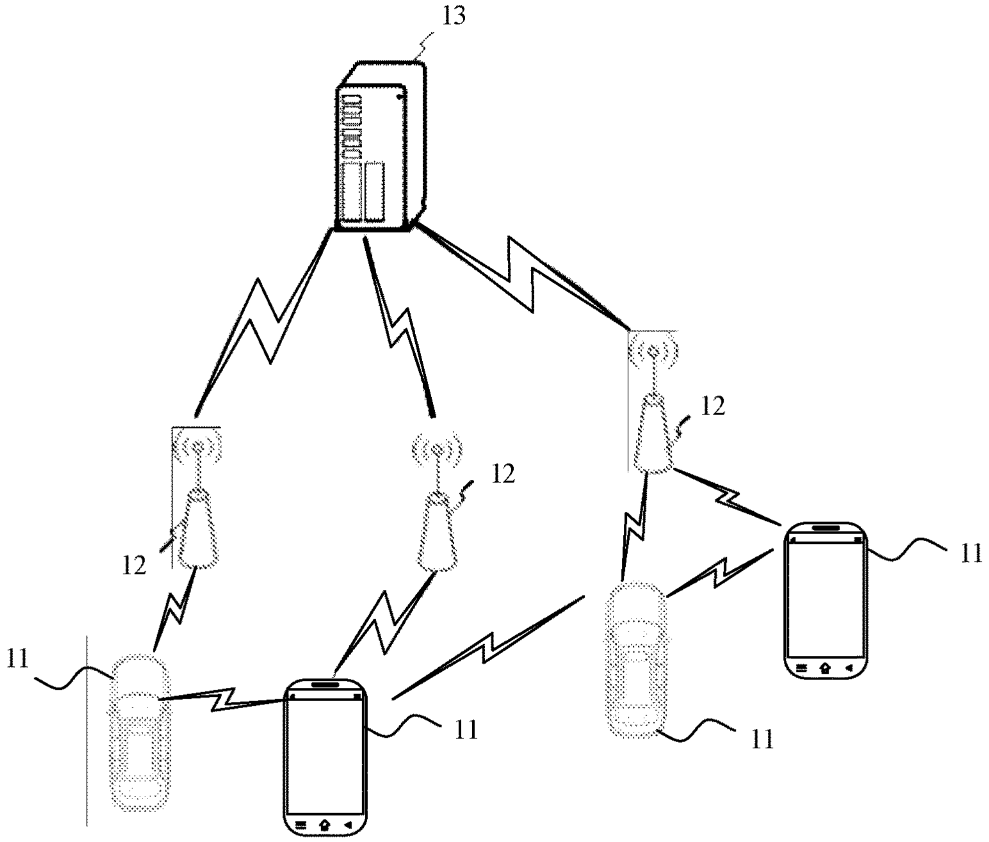
FIG. 1 is a schematic structural diagram of a wireless communication system illustrated according to an example.

Please refer to FIG. 1, which shows a schematic structural diagram of a wireless communication system provided by an example of the disclosure. As shown in FIG. 1, the wireless communication system is a communication system based on a cellular mobile communication technology, and the wireless communication system may include: a plurality of terminals 11 and a plurality of base stations 12.

Each terminal 11 may refer to a device that provides voice and/or data connectivity to a user. The terminal 11 may communicate with one or more core networks via a Radio Access Network (RAN), and the terminal 11 may be an Internet of Thing terminal, such as a sensor device, a mobile phone (or called a "cellular" phone) and a computer with the Internet of Thing terminal, for instance, may be fixed, portable, pocket-sized, hand-held, computer-built or vehicle-mounted apparatuses. For instance, the terminal may be a station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be a vehicle-mounted device, for instance, a trip computer with a wireless communication function, or a wireless communication device externally connected to the trip computer. Alternatively, the terminal 11 may also be a roadside device, for instance, may be a streetlight, a signal light, or other roadside devices with the wireless communication function.

Each base station 12 may be a network-side device in the wireless communication system. The wireless communication system may be the 4th generation mobile communication (4G) system, also known as a Long Term Evolution (LTE) system; alternatively, the wireless communication system may also be a 5G system, also known as a new radio (NR) system or a 5G NR system. Alternatively, the wireless communication system may also be a next-generation system of the 5G system. An access network in the 5G system may be called a New Generation-Radio Access Network (NG-RAN), or an MTC system.

The base station 12 may be an evolved base station (eNB) used in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with a protocol stack of a Packet Data Convergence Protocol (PDCP) layer, a Radio Link Control (RLC) protocol layer, and a Media Access Control (MAC) layer; and the distributed unit is provided with a Physical (PHY) layer protocol stack. The specific implementation of the base station 12 is not limited in the example of the disclosure.

A wireless connection may be established between the base station 12 and the terminal 11 through a wireless air interface. In different implementations, the wireless air interface is a wireless air interface based on a 4th generation mobile communication network technology (4G) standard; alternatively, the wireless air interface is a wireless air interface based on a 5th generation mobile communication network technology (5G) standard, for instance, the wireless air interface is a new radio; alternatively, the wireless air interface may also be a wireless air interface based on a next generation of 5G mobile communication network technology standard.

In some examples, an End to End (E2E) connection may also be established between the terminals 11, for instance, vehicle to vehicle (V2V) communication, vehicle to infrastructure (V2I) communication, vehicle to pedestrian (V2P) communication and other scenarios in vehicle to everything (V2X) communication.

In some examples, the above wireless communication system may further contain a network management device 13.

The plurality of base stations 12 are separately connected with the network management device 13. The network management device 13 may be a core network device in the wireless communication system. For instance, the network management device 13 may be a Mobility Management Entity (MME) in an Evolved Packet Core (EPC) network. Alternatively, the network management device may also be other core network devices, such as a Serving GateWay (SGW), a Public Data Network GateWay (PGW), a Policy and Charging Rules Function (PCRF) or a Home Subscriber Server (HSS). An implementation form of the network management device 13 is not limited in the example of the disclosure.

Figure 2:
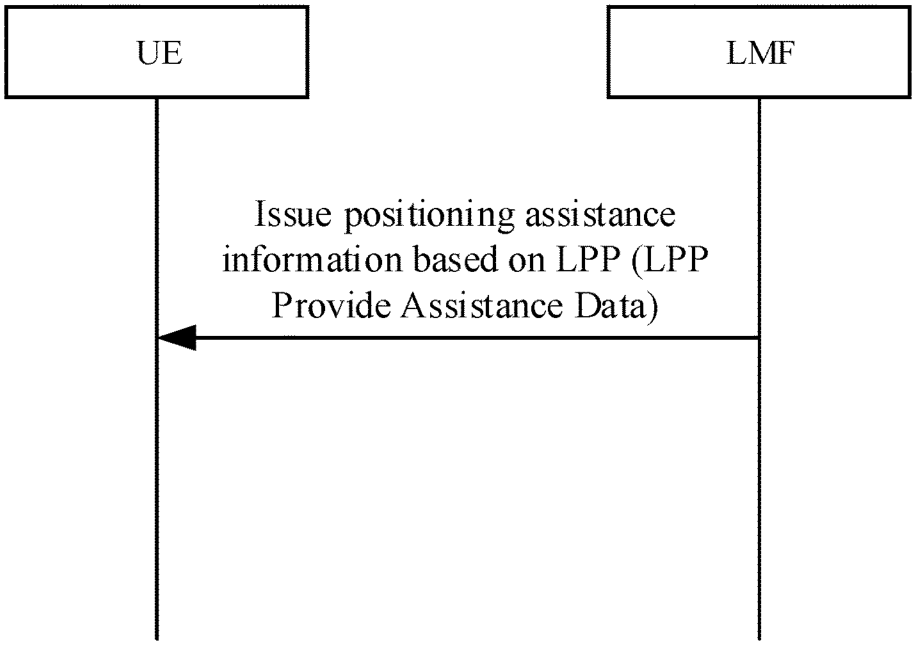
FIG. 2 is a schematic flow chart of an information processing method illustrated according to an example.
Figure 3A:
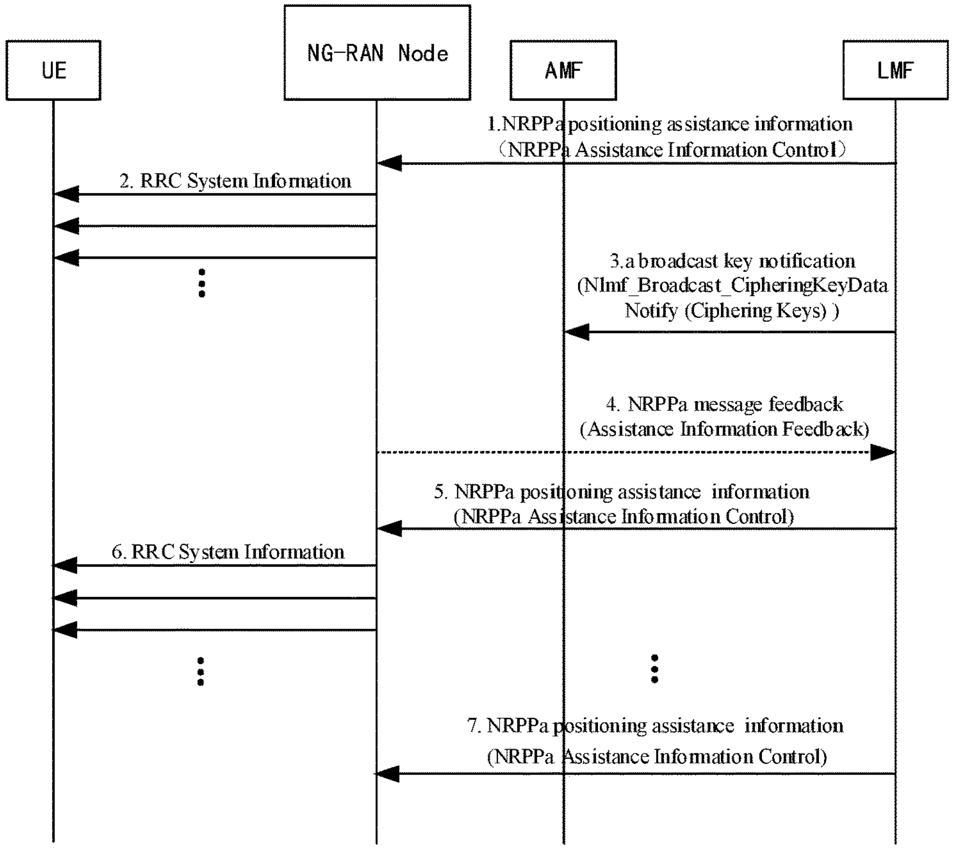
FIG. 3A is a schematic flow chart of an information processing method illustrated according to an example.

FIG. 2 is a schematic diagram of an LMF issuing positioning assistance information to the terminal based on LPP. For instance, the LMF may perform unvarnished transmission to UE through a base station. 5G R16 has introduced a variety of positioning technologies, and can realize positioning of the UE in the RRC connected state. For some of positioning technologies, the positioning assistance information needs to be provided for the UE through a network. For instance, as shown in FIG. 2, the LMF provides the positioning assistance information for the UE through an LPP message. In addition, the LMF may also send the positioning assistance information to the base station through an NRPPa message, and then the base station sends the information to the UE through a system message. As shown in FIG. 3A, the following steps may be included:

1. The LMF sends NRPPa positioning assistance information (NRPPa Assistance Information Control) to wireless access points such as the base station, for instance, a Next Generation-Radio Access Network (NG-RAN) node such as a 5G base station shown in FIG. 3A.
2. The NG-RAN node sends RRC system information to the UE.
3. The LMF sends a broadcast key notification (Nlmf_Broadcast_CipheringKeyData Notify (Ciphering Keys)) to an Access Management Function (AMF). The Ciphering Keys are keys for encrypting information broadcasted by the base station.
4. The NG-RAN node sends NRPPa message feedback (Assistance Information Feedback) to the LMF to feed back on whether the message sent by the LMF has been correctly received. This step is an alternative step.
5. The LMF sends the NRPPa positioning assistance information (NRPPa Assistance Information Control) to wireless access points such as the base station.
6. The RRC system information is sent.
7. The LMF sends the NRPPa positioning assistance information (NRPPa Assistance Information Control) to wireless access points such as the base station.

Figure 3B:
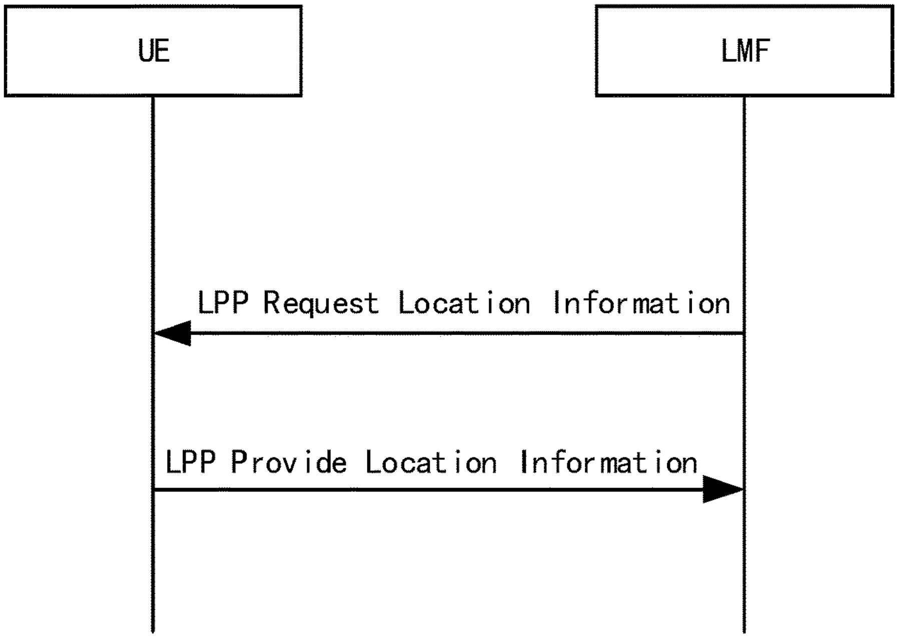
FIG. 3B is a schematic flow chart of an information processing method illustrated according to an example.

Through the above mechanism, the network may send the positioning assistance information to the UE. In the meantime, positioning of the UE in the RRC connected state is completed through a process as shown in FIG. 3B, including: LPP request location information and LPP provide location information.

In order to save energy consumption of the UE and reduce positioning delay, 5G raises requirements for positioning UE in the RRC idle state and the inactive state. 5G NR Rel-16 merely supports positioning of the UE in the RRC connected state, but does not support positioning measurement of the UE in the RRC idle state or the RRC inactive state.

However, it should be noted that: the method shown in FIG. 2 to FIG. 3B applies to the UE in the RRC connected state. In response to determining that the network needs to positioning the UE, the LMF sends a location request to the UE through an LPP message. In response to receiving the above request, the UE completes positioning measurement according to content of request information, and then reports a measurement result or location information. For the UE in the RRC idle state or the RRC inactive state, the LMF cannot request location information of the UE by sending the LPP message. How the network sends a location request message to the UE in the RRC idle state or the RRC inactive state needs to be solved.

Figure 5A:
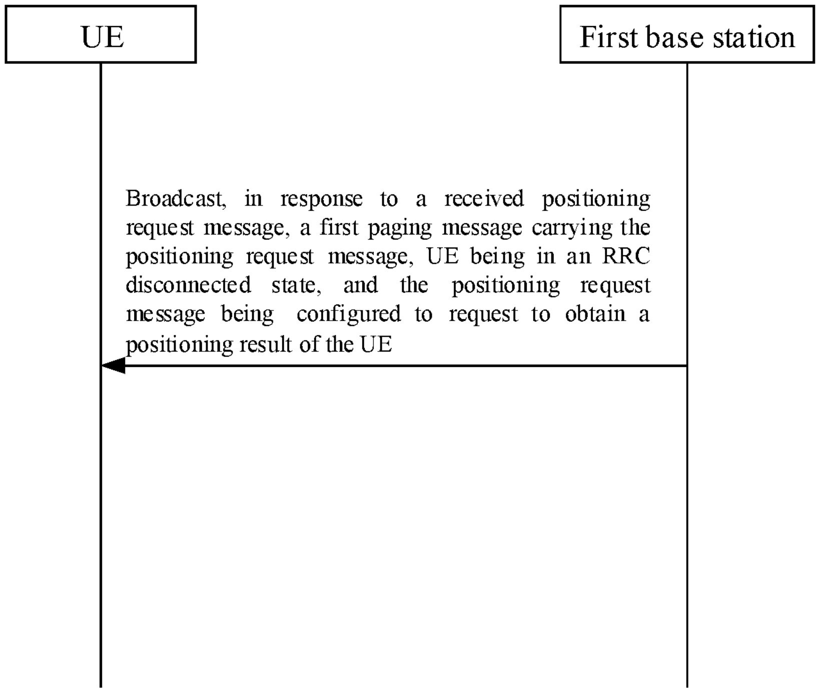
FIG. 5A is a schematic flow chart of another information processing method illustrated according to an example.

In view of this, as shown in FIG. 5A, an example provides an information processing method, applied to a first base station anchored by UE. The method includes:

in response to a received positioning request message, a first paging message carrying the positioning request message is broadcast. The UE is in an RRC disconnected state, and the positioning request message is configured to request a positioning result of the UE.

Figure 4A:
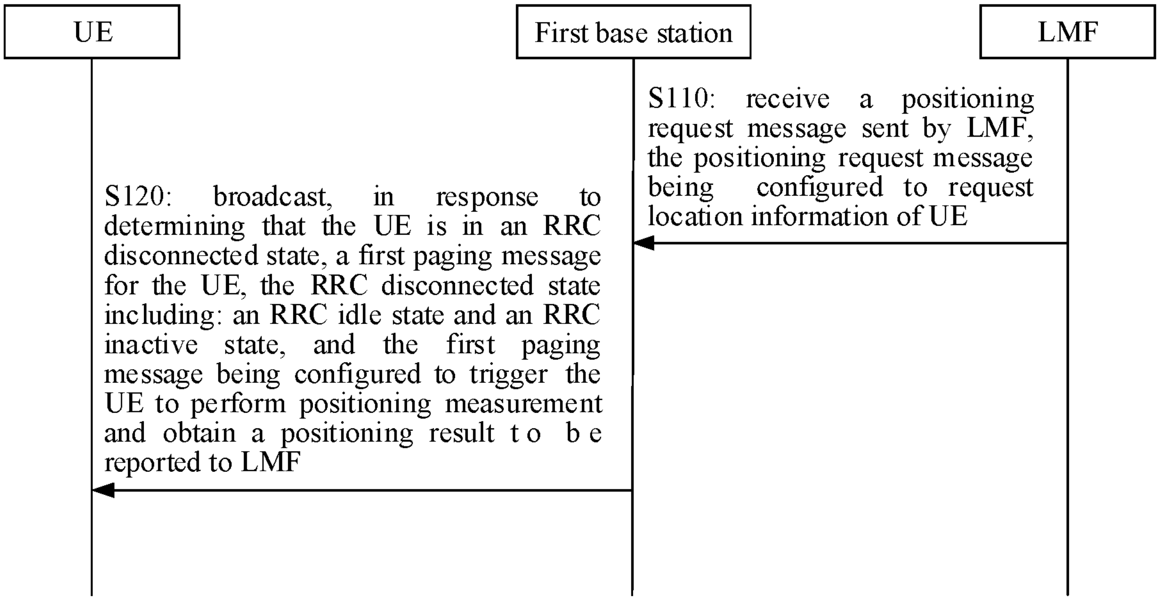
FIG. 4A is a schematic flow chart of an information processing method illustrated according to an example.

In some examples, as shown in FIG. 4A, the information processing method provided by the example of the application may further include:

S110: the positioning request message sent by LMF is received, and the positioning request message is configured to request location information of the UE; and

S120: in response to determining that the UE is in the RRC disconnected state, the first paging message for the UE is broadcast.

The RRC disconnected state includes: the RRC idle state and the RRC inactive state. The first paging message is configured to trigger the UE to perform positioning measurement and obtain the positioning result to be reported to the LMF.

In the example of the application, the first base station may be an anchored base station of the UE, and the anchored base station is a base station that finally provides services for the UE.

In the example of the application, the UE may be various types of terminals that can be connected to the base station, including but not limited to: at least one of a mobile phone, a tablet, a vehicle-mounted device, an industrial device, a wearable device and a medical device.

In the example of the application, before switching from the RRC connected state to the RRC idle state or the RRC inactive state, the UE receives the first paging message issued by the base station.

In the example of the application, the first paging message carries the positioning request message. The positioning request message is information for the LMF to indicate performing of the positioning measurement.

The LMF may send the positioning request message to the first base station through an NRPPa protocol. After receiving the positioning request message, the first base station may directly load the positioning request message into the first paging message to broadcast to the UE.

The first paging message may be one kind of paging messages, such that the UE can receive the first paging message upon paging. However, the first paging message carries the positioning request message and is different from a normal second paging message not carrying the positioning request message. In response to receiving the paging message carrying the positioning request message upon paging, the UE understands that the first base station is not really paging the UE to cause the UE to switch from the RRC disconnected state to the RRC connected state, but requires the UE to perform the positioning measurement.

In this way, after receiving the first paging message, the UE may immediately perform the positioning measurement and obtain the positioning result. The positioning result may include: a measurement value of a positioning reference signal and/or location information of the UE. The location information of the UE is indication information of a location of the UE obtained through calculation based on the measurement value. In a random access procedure of the UE, the positioning result is returned to the first base station, and the first base station may return the positioning result to the LMF. The LMF receiving the positioning result is the LMF issuing the positioning request message.

After completing report of the positioning result, the UE may end the random access procedure and maintain the RRC disconnected state; or the UE ends the random access procedure after receiving a reception recognition notice on the positioning result issued by the first station and maintains the RRC disconnected state. The UE in the RRC disconnected state can complete the positioning measurement. Compared to switching the UE in the RRC disconnected state to the RRC connected state and then reporting the positioning result, delay of the positioning measurement may be shortened, and a speed of the positioning measurement may be improved.

Figure 4B:
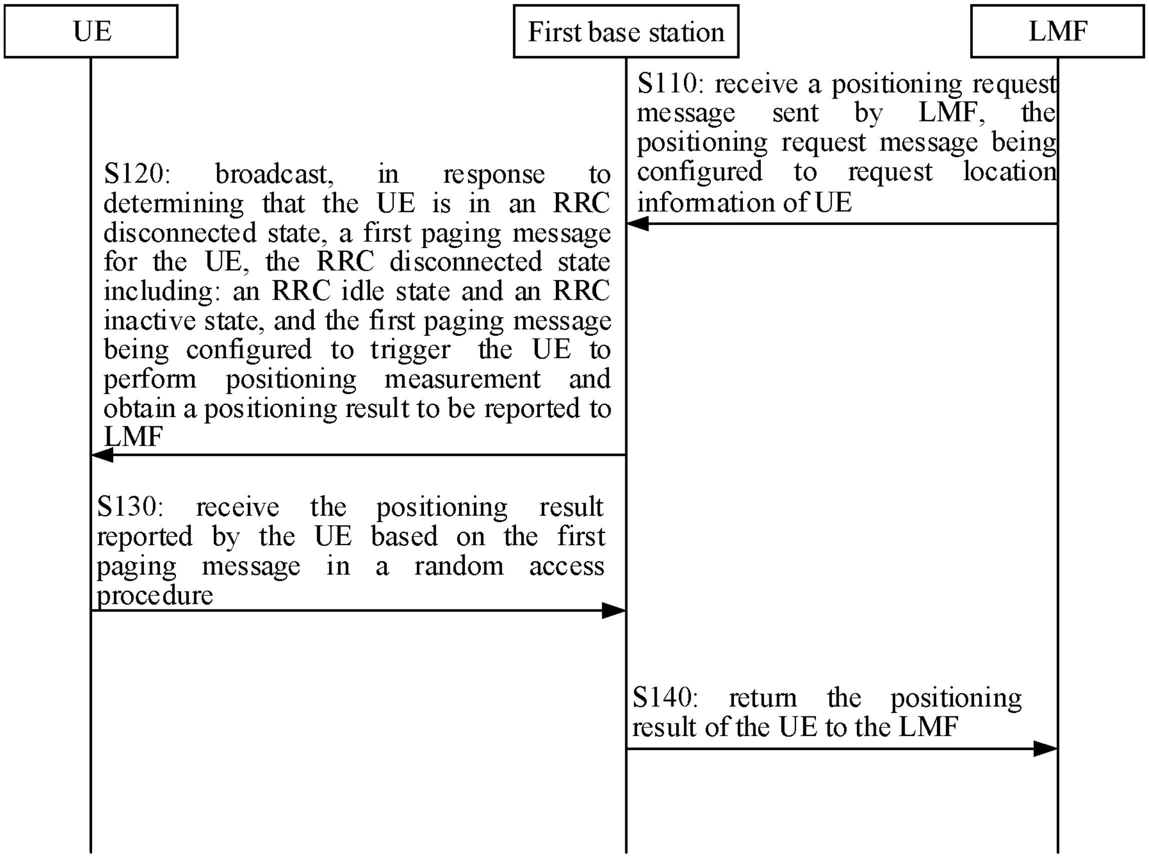
FIG. 4B is a schematic flow chart of an information processing method illustrated according to an example.

In some examples, as shown in FIG. 4B, the method further includes:

S130: the positioning result reported by the UE based on the first paging message in a random access procedure is received; and

S140: the positioning result of the UE is returned to the LMF.

Figure 5B:
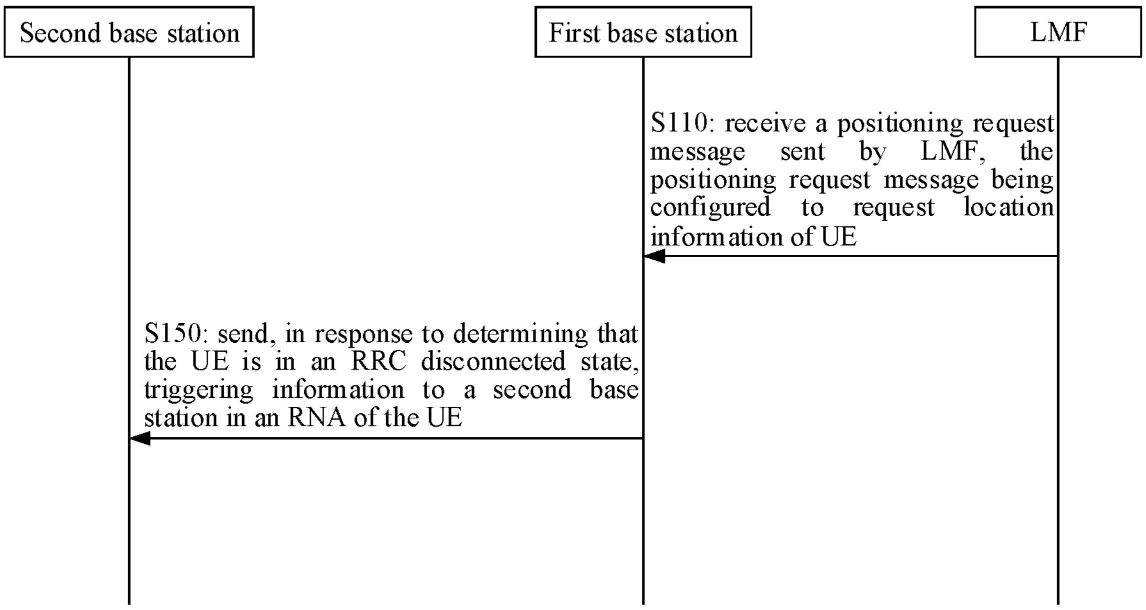
FIG. 5B is a schematic flow chart of another information processing method illustrated according to an example.

In some examples, as shown in FIG. 5B, the method further includes:

S150: in response to determining that the UE is in the RRC disconnected state, triggering information is sent to a second base station in an RNA of the UE. The triggering information includes: the first paging message, or the positioning request message and a second paging message not carrying the positioning request message. The second paging message is configured to trigger the second base station to send the first paging message to the UE; and the first paging message is configured to trigger the UE to perform positioning measurement and obtain the positioning result to be reported to the LMF.

In some examples, the first base station directly sends the first paging message to the second base station in the RAN of the UE. In this way, after receiving the first paging message, the second base station may directly broadcast the same.

In a case that the first base station sends the second paging message and the positioning request message, at the moment, the positioning request message is decoupled from the second paging message, so transmission of the positioning request message and the second paging message is flexible, and the positioning request message and the second paging message may be sent together or the positioning request message is sent separately and the second paging message is sent separately in any suitable time between the first base station and the second base station. After receiving the second paging message and the positioning request message, the second base station generates the first paging message by itself and broadcast the same to the UE.

The second paging message may be a normal paging message for paging UE in the related art.

In some examples, after the first base station broadcasts the first paging message, in response to receiving the positioning result reported by the UE within preset time, it is indicated that the UE is in a cell corresponding to the first base station and the first paging message does not need to be broadcast again by the second base station in the RAN. From a condition of reducing signaling interaction between the first base station and the second base station and lowering signaling overhead, the triggering information may be sent to the second base station in response to determining that the positioning result is not received within the preset time.

In some examples, upon receiving the positioning request message and broadcasting the first paging message in the cell corresponding to it, the first base station directly sends the triggering information to the second base station without waiting. In this way, in response to that the UE is located in a cell of the second base station, delay in obtaining the positioning result may be further reduced.

In some examples, S150 may include: the triggering information is sent to the second base station in the RNA of the UE through an Xn interface between the base stations.

In some other examples, the first base station and the second base station may also forward the triggering information to each other through transmission links such as a return link. However, by transmitting the triggering information through the Xn interface, a length of a transmission path may be reduced and delay of obtaining the positioning result may be shortened.

The positioning request message further includes: positioning configuration for performing the positioning measurement by the UE.

The positioning configuration is configured to indicate at least one of the following configurations:

a positioning measurement manner;

a measurement parameter of positioning;

a positioning quality of service (Qos) request; or identifier information of the UE performing the positioning measurement.

The positioning measurement manner includes but is not limited to at least one of a manner of Downlink-Time Difference of Arrival (DL-TDOA), a manner of UPlink-Time Difference of Arrival (UL-TDOA), a manner of Downlink-Arrival of Angle (DL-AOA), and an Enhanced Cell-IDentifier positioning method (E-CID).

The measurement parameter of the positioning includes but is not limited to Position Reference Signals-Reference Signal Receiving Power (PRS-RSRP) and Position Reference Signals-Reference Signal Time Difference (PRS-RSTD).

The positioning quality of service request, the positioning quality of service (Qos) request includes: a positioning precision and/or positioning delay.

An identifier of the UE performing the positioning measurement, for instance, includes an International Mobile Subscriber Identification Number (IMSI) or a Temporary Mobile Subscriber Identity (TMSI) of the UE. The identifier of the UE may notify the base station to which UE it needs to forward the positioning request message, or notify that it needs to issue the positioning request message through the paging message.

By performing the positioning measurement based on the above positioning assistance information, it may be ensured that the UE performs the positioning measurement according to a positioning manner, positioning precision and/or positioning quality of service needed by the LMF, and reports the positioning result expected by the LMF.

In response to determining that the positioning request message contains the positioning configuration, the positioning configuration may be sent to the UE at the same time and the UE is informed to perform the positioning measurement. So, the first paging message carries the positioning configuration.

In some examples, the first paging message includes:

a first IE, carrying positioning indication information that indicates the UE to perform the positioning measurement;

and/or a second IE, carrying the positioning configuration.

The first IE carries the positioning indication information that indicates the UE to perform the positioning measurement. In this way, after receiving the first paging message, the UE determines whether to perform the positioning measurement according to the first IE.

The second IE carries part or all content of the positioning configuration. Under some circumstances, where part of the positioning configuration has been issued to the UE or only part of the positioning configuration is updated currently, the second IE may carry merely the part of the positioning configuration. Under some circumstances, where the positioning configuration is not sent to the UE, or the issued positioning configuration becomes invalid or is fully updated, the second IE may carry all the positioning configuration.

The first IE and the second IE are two IEs independent from each other which facilitates decoding between the base station and the UE.

In some examples, the positioning request message may carry the positioning assistance information, or may not carry the positioning assistance information. Or, the positioning assistance information may be issued ahead of the positioning request message, or be received from the first base station after the positioning request message. The positioning assistance information and the positioning configuration are both for performing the positioning measurement by the UE.

In some examples, the method further includes: a request message configured to request the positioning assistance information is sent. The positioning assistance information includes a cell identifier of the positioning measurement and/or a base station identifier of the positioning measurement, and resource location information of a positioning reference signal of the positioning measurement.

In some examples, sending the request message configured to request the positioning assistance information includes:

in response to determining that the positioning assistance information sent by the LMF is not received, the request message is sent to the LMF. The positioning assistance information includes the cell identifier of the positioning measurement and/or the base station identifier of the positioning measurement, and the resource location information of the positioning reference signal of the positioning measurement.

In some examples, the method further includes: the positioning assistance information returned based on the request message is received.

The positioning assistance information includes: the cell identifier of the positioning measurement and/or the base station identifier of the positioning measurement, and the resource location information of the positioning reference signal of the positioning measurement.

In some examples, the cell identifier may be: an identifier of a last stayed serving cell or a neighboring cell to the last stayed serving cell.

In some other examples, the base station identifier may be: an identifier of a base station of a serving cell where the UE last stayed, or an identifier of a base station of the neighboring cell of a serving cell where the UE last stayed.

Through the cell identifier and/or the base station identifier, the terminal may be aware of a measurement object. When the positioning measurement is performed, the measurement is performed on the position reference signals (PRS) sent by the cell or the base station. When performing the positioning measurement, the terminal needs to be aware of the resource location information of the PRS. The resource location information indicates a time frequency resource sent by the PRS.

Sending, in response to determining that the positioning assistance information sent by the LMF is not received, the request message to the LMF includes:

in response to determining that the positioning request message does not contain the positioning assistance information, the request message is sent to the LMF;

or in response to determining that the positioning assistance information is not received within specific time before or after receiving the positioning request message, the request message is sent to the LMF.

In response to sending the request message, the positioning assistance information issued by the LMF based on the request information will be received.

In some examples, the method further includes:

a system message carrying the positioning assistance information is sent. The positioning assistance information includes the cell identifier of the positioning measurement and/or the base station identifier of the positioning measurement, and the resource location information of the positioning reference signal of the positioning measurement.

The positioning assistance information is carried by the system message, so the UE receives the positioning assistance information without switching to the RRC disconnected state, and using the system message to carry the positioning assistance information has a characteristic convenient information coding/decoding.

In some examples, sending the system message carrying the positioning assistance information includes: the system message carrying the positioning assistance information is broadcast; or an on-demand obtaining request is received, and the system message carrying the positioning assistance information is returned based on the on-demand obtaining request.

In some examples, the method further includes: in response to determining that the positioning assistance information of the LMF is not received, the request message is sent to the LMF; and the positioning assistance information returned based on the request message is received.

In some examples, sending the system message carrying the positioning assistance information includes:

according to the positioning measurement manner applied by the positioning assistance information, a system information block (SIB) matched with the positioning measurement manner is issued.

The system message contains a plurality of different system information blocks. In some examples, different system information blocks may be used for positioning assistance information of different positioning manners, so they may be distinguished easily by the UE.

In some examples, receiving the positioning result reported by the UE based on the first paging message in the random access procedure includes:

the positioning result reported by the UE based on the first paging message through a message A of 2-step random access procedure is received;

or the positioning result reported by the UE based on the first paging message through a message 3 or a message 5 of 4-step random access procedure is received.

The UE still intends to perform the positioning measurement while maintaining the RRC disconnected state. The RRC disconnected state will launches the random access procedure. The random access procedure may be a 2-step random access procedure or a 4-step random access procedure. In the case of the 2-step random access procedure, the UE may carry indication on re-obtaining the positioning assistance information in a random access message (MsgA). In this way, the base station re-issues the positioning assistance information to the UE in response to receiving the MsgA, and in the meantime, the base station and/or the UE ends the random access procedure. In the case of the 4-step random access procedure, the UE may carry indication on re-obtaining the positioning assistance information in a random access message (Msg1 or Msg3). In this way, the base station re-issues the positioning assistance information to the UE in a Msg2 or Msg4, and in the meantime, the base station and/or the UE ends the random access procedure. By ending the random access procedure in advance, the UE will maintain the RRC disconnected state and will not switch to the RRC connected state with high energy consumption, so power consumption of the UE is reduced and a standby duration of the UE is prolonged.

Figure 6:
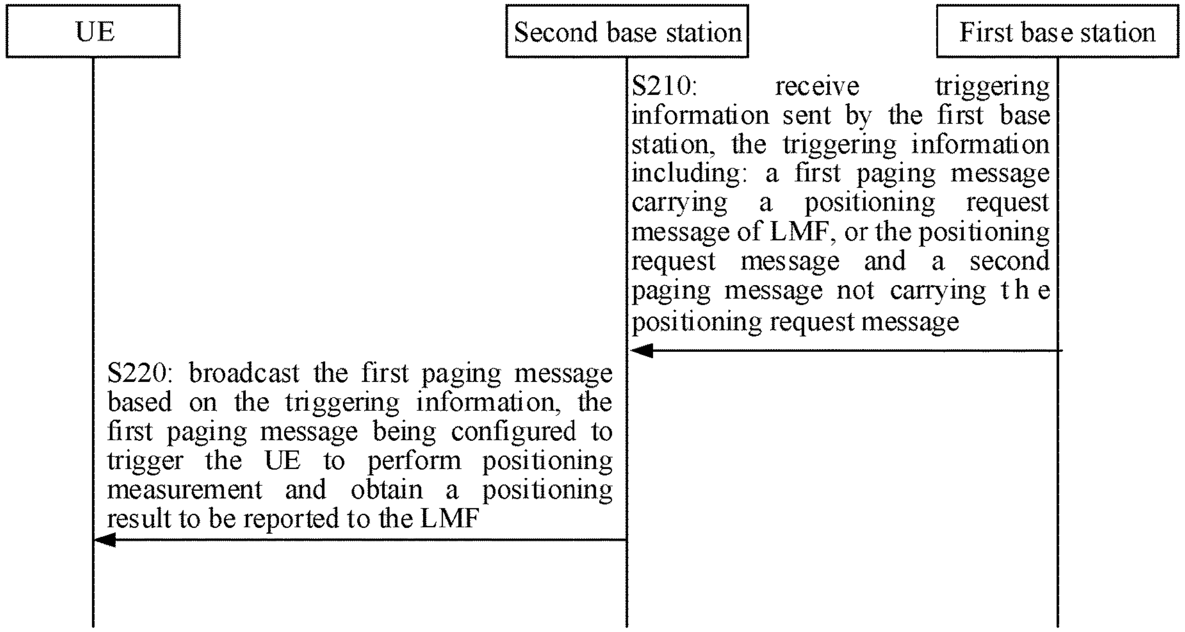
FIG. 6 is a schematic flow chart of another information processing method illustrated according to an example.

As shown in FIG. 6, an example provides an information processing method, applied to a second base station in an RNA of UE. The second base station is different from a first base station anchored by the UE, and the method includes:

S210: triggering information sent by the first base station is received, and the triggering information includes: a first paging message carrying a positioning request message of LMF, or the positioning request message and a second paging message not carrying the positioning request message; and S220: the first paging message based on the triggering information is broadcast, and the first paging message is configured to trigger the UE to perform positioning measurement and obtain a positioning result to be reported to the LMF.

The first base station and the second base station are both stations in the RAN of the UE. The first base station is an anchored base station of the UE, and the second base station is a base station in addition to the first base station.

The second base station receives the first paging message or the second paging message and the positioning request message of the first base station. In this way, the second base station knows it needs to trigger the UE to perform the positioning measurement by sending the first paging message different from the second paging message to the UE, and to report the positioning result, so as to shorten delay of the positioning measurement.

Figure 7:
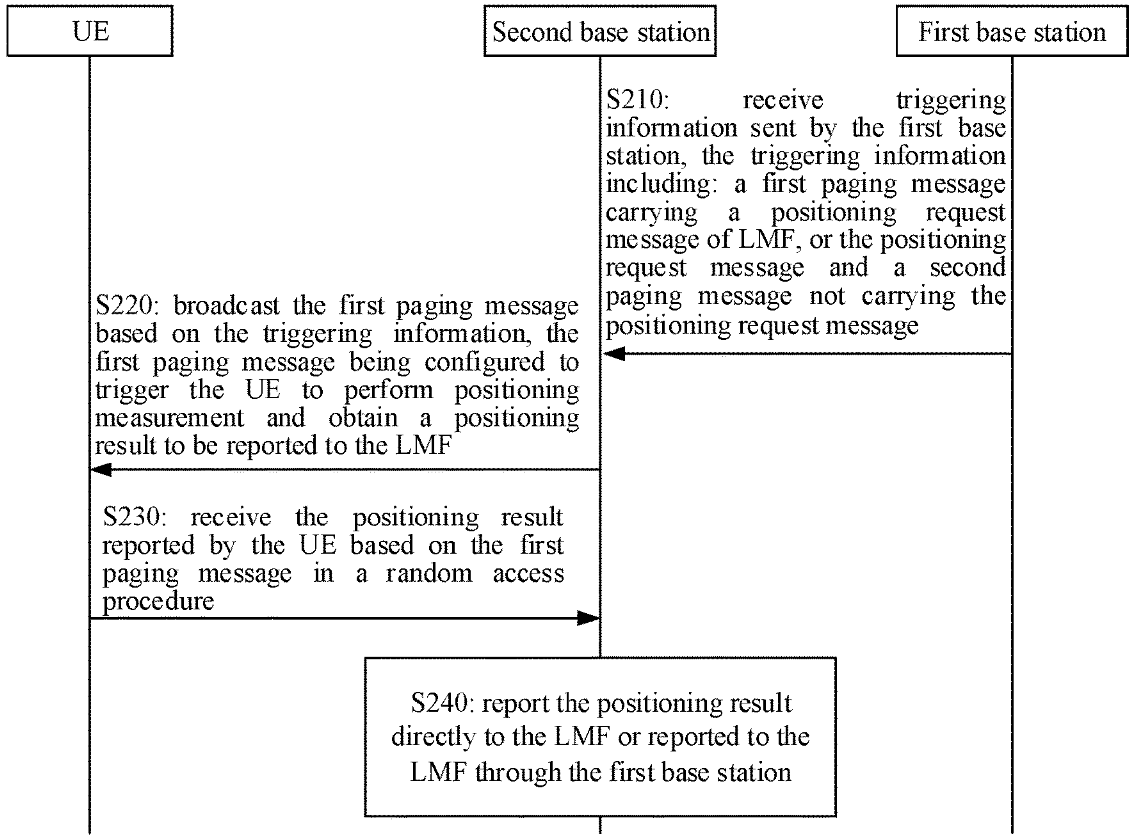
FIG. 7 is a schematic flow chart of an information processing method illustrated according to an example.

In some examples, as shown in FIG. 7, the method further includes:

S230: the positioning result reported by the UE based on the first paging message in a random access procedure is received; and S240: the positioning result is directly reported to the LMF or reported to the LMF through the first base station.

In the example of the application, after receiving the positioning result sent by the UE, the second base station may directly report to the LMF, or may send the same to the first base station, such that the first base station forwards (for instance, unvarnished transmission) the positioning result to the LMF.

In some examples, the positioning request message further includes: positioning configuration for performing the positioning measurement by the UE.

the positioning configuration is configured to indicate at least one of the following configurations:

a positioning measurement manner;

a measurement parameter of positioning;

a positioning quality of service (Qos) request; or identifier information of the UE performing the positioning measurement.

For relevant description on the positioning configuration here, reference may be made to the above example, which will not be repeated here.

In some examples, the first base station and/or the second base station may separately issue the positioning configuration to the UE. However, in order to reduce signaling overhead and further reduce delay of the positioning measurement, the first paging message carries the positioning configuration.

In some examples, the first paging message includes:

a first IE, carrying positioning indication information that indicates the UE to perform the positioning measurement; and a second IE, carrying the positioning configuration.

In some examples, the first paging message issued by the first base station and/or the second base station may carry the second IE merely. In response to receiving the second IE, the UE determines that it needs to perform the positioning measurement, so a message length of the first paging message may be further shortened.

The second IE may carry part or all content of the positioning configuration.

In some examples, the method further includes:

in response to determining that the positioning assistance information issued by the LMF is not received, a request message for obtaining the positioning assistance information is sent to the LMF or the first base station, and the positioning assistance information includes a cell identifier of the positioning measurement and/or a base station identifier of the positioning measurement, and resource location information of a positioning reference signal of the positioning measurement; and the positioning assistance information returned based on the request message is received.

In response to determining that the second base station does not receive the positioning assistance information, the first base station may directly request the LMF, or may request the first base station. In response to that the first base station has the positioning assistance information by coincidence, a transmission path for the second base station to obtain the positioning assistance information may be shortened, and the delay of obtaining the positioning assistance information is shortened.

In some examples, the positioning assistance information may be carried in the first paging message, or may be carried in a system message. The system message may be a system message broadcast by the base station, or may be a system message obtained based on an on-demand obtaining request of the UE.

In some examples, S240 may include:

the positioning result reported by the UE based on the first paging message through a message A of 2-step random access procedure is received;

or the positioning result reported by the UE based on the first paging message through a message 3 or a message 5 of 4-step random access procedure is received.

Figure 8A:
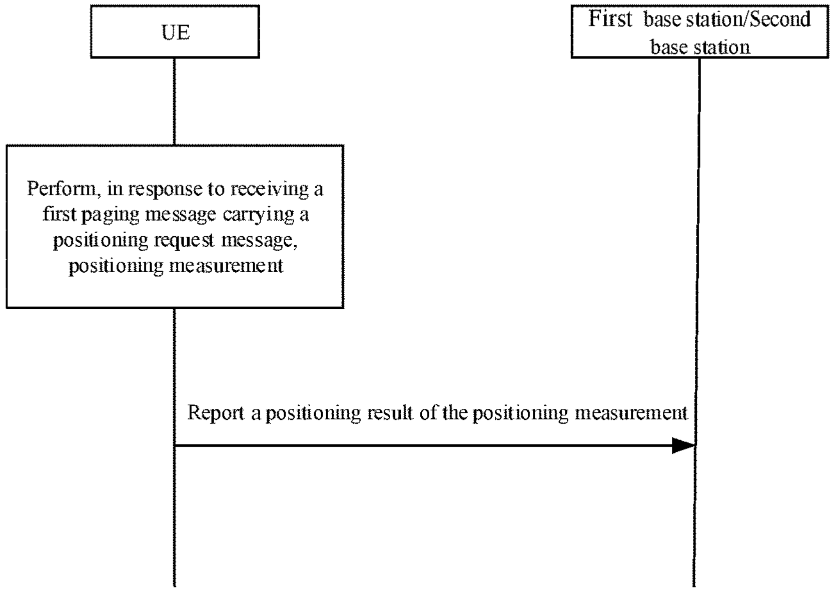
FIG. 8A is a schematic flow chart of another information processing method illustrated according to an example.

As shown in FIG. 8A, an example of the application provides an information processing method, applied to UE, and including: in response to receiving a first paging message carrying a positioning request message, positioning measurement is performed; and a positioning result of the positioning measurement is reported.

Figure 8B:
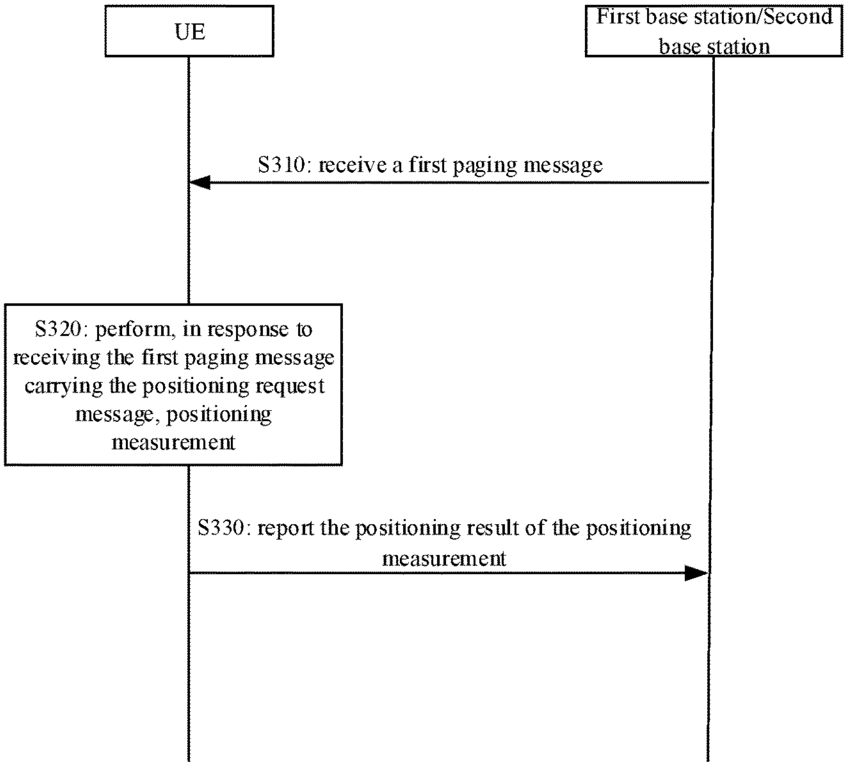
FIG. 8B is a schematic flow chart of another information processing method illustrated according to an example.

In some examples, as shown in FIG. 8B, the information processing method applied to the UE may include:

S310: the first paging message is received;

S320: in response to receiving the first paging message carrying the positioning request message, the positioning measurement is performed; and S330: the positioning result of the positioning measurement is reported.

The UE may be various types of terminals that can be connected to the base station, including but not limited to: at least one of a mobile phone, a tablet, a vehicle-mounted device, an industrial device, a wearable device and a medical device.

In this way, the UE is in the RRC disconnected state, and S310 may include:

The first paging message is received from a first base station anchored by the UE, or the first paging message is received from a second base station in an RNA of the UE. The second base station is a base station in addition to the first base station in the RNA.

In this way, after the UE in the RRC disconnected state receives a paging message, in response to determining that the paging message is the first paging message carrying a positioning request message, the UE may perform the positioning measurement and report the positioning result. S330 may include: the UE reports the positioning result to the base station from which it receives the first paging message. For instance, the UE receives the first paging message from the first base station, and it reports the positioning result to the first base station; or the UE receives the first paging message from the second base station, and it reports the positioning result to the second base station.

The UE in the RRC disconnected state can perform the positioning measurement without switching to the RRC connected state after receiving the positioning request message under the RRC disconnected state, so positioning delay is shortened.

In some examples, the first paging message further carries positioning configuration.

S320 may include: in response to receiving the first paging message carrying the positioning request message, the positioning measurement is performed according to the positioning configuration.

In some examples, the positioning configuration is configured to indicate at least one of the following configurations:

a positioning measurement manner;

a measurement parameter of positioning;

a positioning quality of service (Qos) request; or identifier information of the UE performing the positioning measurement.

For the specific content of the positioning configuration here, reference may be made to any of the above example, which will not be repeated here.

In some examples, reporting the positioning result of the positioning measurement includes: reporting the positioning result reported based on the first paging message through a message A of 2-step random access procedure; or reporting the positioning result reported based on the first paging message through a message 3 or a message 5 of 4-step random access procedure.

The example of the application proposes a method for positioning the UE in the RRC inactive state. In response to determining that a network has a positioning requirement for the UE in the RRC inactive state, the LMF sends an NRPPa message to the anchored base station of the UE (the NRPPa message is one of the aforementioned positioning request messages), which may be used to request location information of the UE. After receiving the message, the base station sends a paging message to the UE in the RNA. The paging message contains positioning request message, and the UE, after receiving the paging message, completes the positioning measurement, and reports a measurement result or location information.

In response to determining that the LMF needs to position the UE in the RRC inactive state, the LMF sends the NRPPa message to the anchored base station (last serving cell) of the UE, for instance, NRPPa request location information. The NRPPa request location message is one kind of the positioning request messages, and the message is used for the LMF to send to the base station to request the location information of the UE.

The message sent by the LMF contains all or part of the following content:

the positioning measurement manner, such as DL-TDOA, UL-TDOA, DL-AOA, E-CID and other information processing methods;

the measurement parameter of positioning, such as PRS-RSRP and/or PRS-RSTD;

the positioning QoS request, such as precision, and time delay; and an ID of the UE, such as NG-5G-S-TMSI.

After receiving the above-mentioned NRPPa message, the base station sends a paging message in the RNA of the UE, and the paging message carries positioning-related information. Specifically, a positioning-related IE may be added in a paging record IE. For instance, a positioning IE is added, and the ID includes two IEs, namely the information processing method and the positioning measurement result. The paging record IE here is one of the aforementioned first IEs; the positioning IE is one of the aforementioned second IEs.

After receiving the above-mentioned NRPPa message, the base station sends the message to other base stations in the RNA of the UE through Xn interfaces among the base stations.

After receiving the paging message, the UE determines the information processing method to be used and the measurement to be performed according to the content of the paging message. In response to determining that a current base station broadcasts a positioning system message needed by the UE, the positioning system message is directly obtained; and in response to determining that the current base station does not broadcast the positioning system message needed by the UE, the UE launches random access procedure, and requests the needed positioning system message in a random access procedure.

In response to determining that the base station does not have a positioning assistance system message sent by the LMF to the base station, the base station sends the NRPPa message to the LMF to request for the positioning assistance system message, and the message indicates a type of positioning assistance system information needed by the base station.

After completing the positioning measurement, the UE launches the random access procedure. For instance, in response to determining that the UE launches random access performed in a 2-step random access channel (RACH), the UE reports the measurement result or the location information on the MSGA; and for another instance, in response to determining that the UE launches random access procedure performed in a 4-step RACH, the UE reports the measurement result or the location information on the MSG3 or MSG5.

For the UE in the RRC idle state or the RRC inactive, the LMF sends the NRPPa message to the anchored base station of the UE for requesting the location information of the UE, and then the anchored base station of the UE launches a RAN paging message in the RNA to request the location information of the UE. After receiving the above information, the UE completes the positioning measurement and reports the result.

Figure 9:
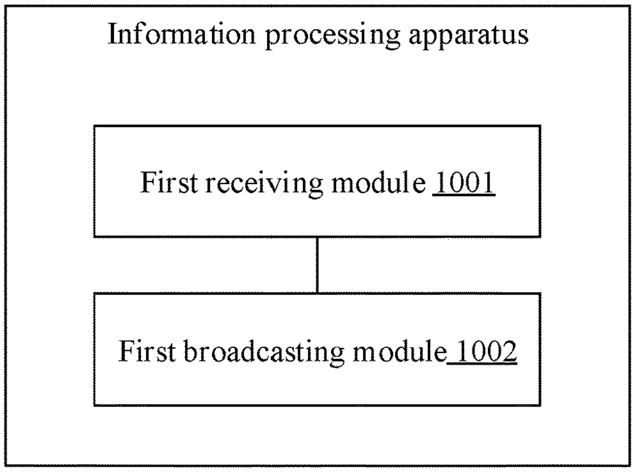
FIG. 9 is a schematic structural diagram of an information processing apparatus illustrated according to an example.

As shown in FIG. 9, an example provides an information processing apparatus, applied to a first base station anchored by UE. The apparatus includes: a first receiving module 1001. The first receiving module 1001 is configured to broadcast, in response to a received positioning request message, a first paging message carrying the positioning request message.

The UE is in an RRC disconnected state, and the positioning request message is configured to request a positioning result of the UE.

In some examples, the apparatus may include: a first broadcasting module 1002 and the first receiving module 1001.

The first receiving module 1001 is configured to receive the positioning request message sent by a location management function (LMF). The positioning request message is configured to request location information of the UE.

The first broadcasting module 1002 is configured to broadcast, in response to determining that the UE is in the RRC disconnected state, the first paging message for the UE. The first paging message is configured to trigger the UE to perform positioning measurement and obtain the positioning result to be reported to the LMF.

The RRC disconnected state includes: the RRC idle state and the RRC inactive state.

In some examples, the first broadcasting module 1002 and a first sending module may be program modules. The program modules, after being executed by a processor, can realize functions of above modules.

In some other examples, the first broadcasting module 1002 and the first sending module may be modules combining hardware and software. The modules combining hardware and software include various programmable arrays. The programmable arrays include: field programmable array or complex programmable array.

In further other examples, the first broadcasting module 1002 and the first sending module may be pure hardware modules. The pure hardware modules include, but are not limited to, application specific integrated circuits.

The apparatus further includes:

the first receiving module 1001, further configured to receive the positioning result reported by the UE based on the first paging message in a random access procedure; and the first sending module, configured to return the positioning result of the UE to the LMF.

In some examples, the first sending module is further configured to send, in response to determining that the UE is in the RRC disconnected state, triggering information to a second base station in a Radio Access Network based Notification Area (RNA) of the UE. The triggering information includes: the first paging message, or the positioning request message and a second paging message not carrying the positioning request message; and the second paging message is configured to trigger the second base station to send the first paging message to the UE.

The first paging message is configured to trigger the UE to perform positioning measurement and obtain the positioning result to be reported to the LMF.

In some examples, the first sending module is configured to send the triggering information to the second base station in the RNA of the UE through an Xn interface between the base stations.

In some examples, the positioning request message further includes: positioning configuration for performing the positioning measurement by the UE.

The positioning configuration is configured to indicate at least one of the following configurations:

a positioning measurement manner;

a measurement parameter of positioning;

a positioning quality of service (Qos) request; or identifier information of the UE performing the positioning measurement.

In some examples, the first paging message carries the positioning configuration.

In some examples, the first paging message includes:

a first IE, carrying positioning indication information that indicates the UE to perform positioning measurement of the UE;

and/or a second IE, carrying the positioning configuration.

In some examples, the first sending module is further configured to send a request message configured to request positioning assistance information.

In some examples, the first receiving module 1001 is configured to receive the positioning assistance information returned based on the request message. In some examples, the first receiving module 1001 is configured to receive the positioning result reported by the UE based on the first paging message through a message A of 2-step random access procedure; or receive the positioning result reported by the UE based on the first paging message through a message 3 or a message 5 of 4-step random access procedure.

Figure 10:
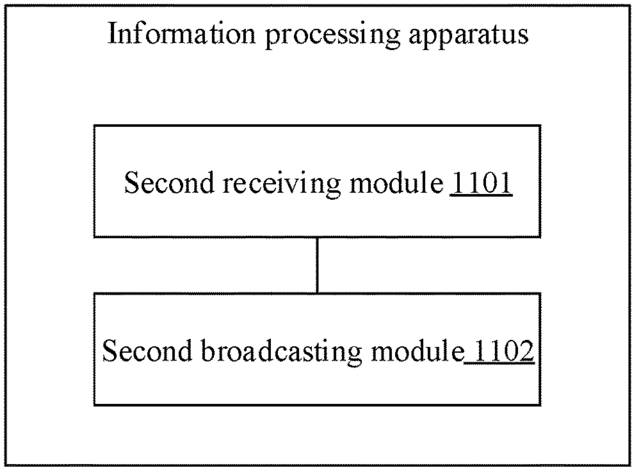
FIG. 10 is a schematic structural diagram of an information processing apparatus illustrated according to an example.

As shown in FIG. 10, an example provides information processing apparatus, applied to a second base station in an RNA of UE. The second base station is different from a first base station anchored by the UE. The apparatus includes: a second receiving module 1101 and a second broadcasting module 1102.

The second receiving module 1101 is configured to receive triggering information sent by the first base station, and the triggering information includes: a first paging message carrying a positioning request message of LMF, or the positioning request message and a second paging message not carrying the positioning request message; and the second broadcasting module 1102 is configured to broadcast the first paging message based on the triggering information, and the first paging message is configured to trigger the UE to perform positioning measurement and obtain a positioning result to be reported to the LMF.

In some examples, the second receiving module 1101 and the second broadcasting module 1102 may be program modules. The program modules, after being executed by a processor, can realize functions of above modules.

In some other examples, the second receiving module 1101 and the second broadcasting module 1102 may be modules combining hardware and software. The modules combining hardware and software include various programmable arrays. The programmable arrays include: field programmable array or complex programmable array.

In further other examples, the second receiving module 1101 and the second broadcasting module 1102 may be pure hardware modules. The pure hardware modules include, but are not limited to, application specific integrated circuits.

In some examples, the second receiving module 1101 is further configured to receive the positioning result reported by the UE based on the first paging message in a random access procedure.

The apparatus further includes:

a second sending module, configured to report the positioning result directly to the LMF or report the same to the LMF through the first base station.

In some examples, the positioning request message further includes: positioning configuration for performing the positioning measurement by the UE.

The positioning configuration is configured to indicate at least one of the following configurations:

a positioning measurement manner;

a measurement parameter of positioning;

a positioning quality of service (Qos) request; or identifier information of the UE performing the positioning measurement.

In some examples, the first paging message carries the positioning configuration.

In some examples, the first paging message includes:

a first IE, carrying positioning indication information that indicates the UE to perform positioning measurement; and/or a second IE, carrying the positioning configuration.

In some examples, the second sending module is further configured to send in response to determining that the positioning assistance information issued by the LMF is not received, a request message for obtaining the positioning assistance information is sent to the LMF or the first base station, and the positioning assistance information includes a cell identifier of the positioning measurement and/or a base station identifier of the positioning measurement, and resource location information of a positioning reference signal of the positioning measurement; and the second receiving module 1101 is further configured to receive the positioning assistance information returned based on the request message.

In some examples, the second receiving module 1101 is configured to receive the positioning result reported by the UE based on the first paging message through a message A of 2-step random access procedure; or receive the positioning result reported by the UE based on the first paging message through a message 3 or a message 5 of 4-step random access procedure.

Figure 11:
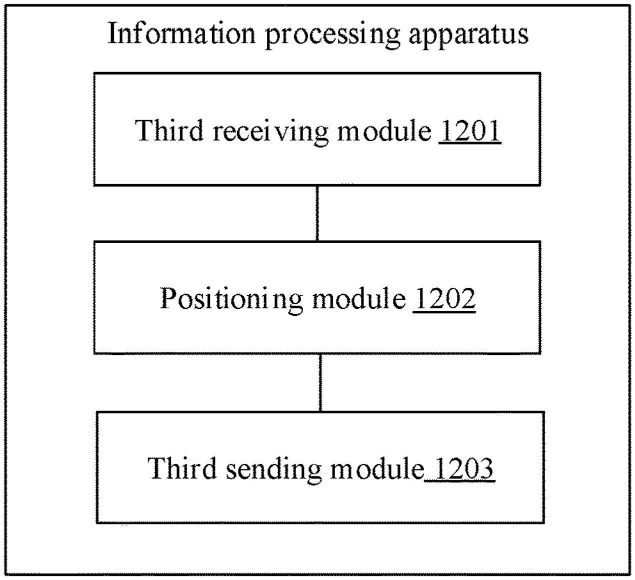
FIG. 11 is a schematic structural diagram of an information processing apparatus illustrated according to an example.

As shown in FIG. 11, an example of the application provides an information processing apparatus, applied to UE, and including: a positioning module 1202 and a third sending module 1203.

The positioning module 1202 is configured to perform, in response to receiving a first paging message carrying a positioning request message, positioning measurement; and the third sending module 1203 is configured to report a positioning result of the positioning measurement.

In some examples, the information processing apparatus may include:

a third receiving module 1201, the positioning module 1202 and the third sending module 1203.

The third receiving module 1201 is configured to receive a first paging message;

the positioning module 1202 is configured to perform positioning measurement in response to receiving the first paging message carrying a positioning request message; and the third sending module 1203 is configured to report a positioning result of the positioning measurement.

In some examples, the third receiving module 1201, the positioning module 1202 and the third sending module 1203 may be program modules. The program modules, after being executed by a processor, can realize functions of above modules.

In some other examples, the third receiving module 1201, the positioning module 1202 and the third sending module 1203 may be modules combining hardware and software. The modules combining hardware and software include various programmable arrays. The programmable arrays include: field programmable array or complex programmable array.

In further other examples, the third receiving module 1201, the positioning module 1202 and the third sending module 1203 may be pure hardware modules. The pure hardware modules include, but are not limited to, application specific integrated circuits.

In some examples, the first paging message further carries positioning configuration; and the positioning module 1202 is configured to perform, in response to receiving the first paging message carrying the positioning request message, the positioning measurement according to the positioning measurement.

In some examples, the third receiving module is further configured to receive the positioning configuration, and the positioning configuration is configured to indicate at least one of the following configurations:

a positioning measurement manner;

a measurement parameter of positioning;

a positioning quality of service (Qos) request; or identifier information of the UE performing the positioning measurement.

In some examples, the third sending module 1203 is configured to report the positioning result reported based on the first paging message through a message A of 2-step random access procedure;

or report the positioning result based on the first paging message through a message 3 or a message 5 of 4-step random access procedure.

An example of the application provides a communication device, including a processor, a transceiver, a memory and an executable program stored on the memory and capable of being run by the processor. The processor, in response to running the executable program, executes the information processing method applied to a base station or the information processing method applied to a terminal according to any one of aforesaid technical solutions.

The communication device may be the aforesaid base station or terminal.

The processor may include various types of storage media. The storage media are non-transitory computer storage media that can continue to memorize information stored after the communication device is powered off. Here, the communication device includes the base station or a user device.

The processor may be connected to the memory through a bus to read the executable program stored on the memory, for instance, at least one of the methods shown in FIG. 2 to FIG. 8B. An example of the application provides a non-transitory computer storage medium. The non-transitory computer storage medium stores an executable program. The executable program, after being executed by a processor, can implement the information processing method applied to a base station or the information processing method applied to a terminal according to any one of aforesaid technical solutions.

An example of the application provides a non-transitory computer readable storage medium, storing an executable program. The executable program, in response to being executed by a processor, implements the information processing method applied to a station or the information processing method applied to a terminal according to any one of aforesaid technical solutions.

Figure 12:
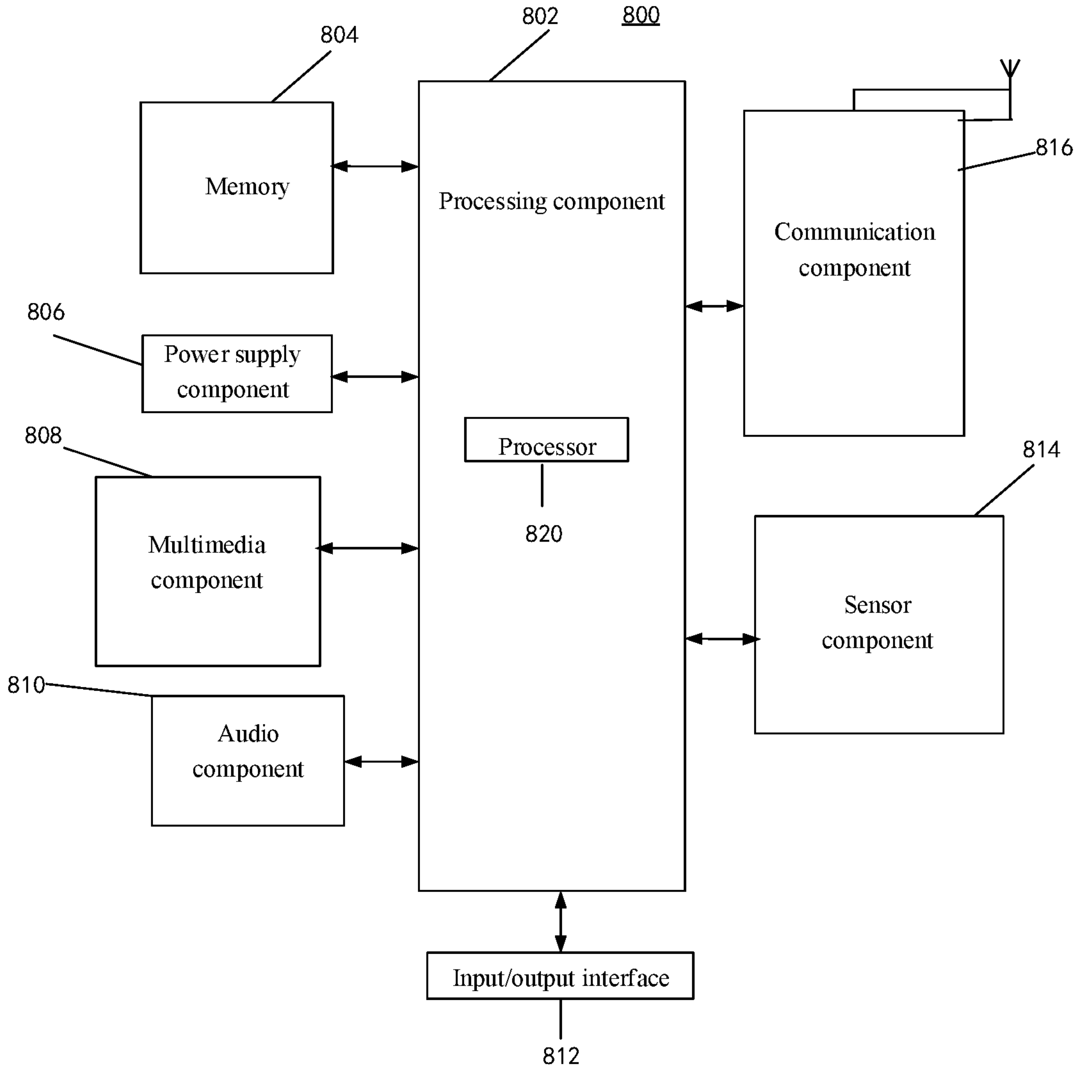
FIG. 12 is a schematic structural diagram of a terminal illustrated according to an example.

FIG. 12 is a block diagram of a terminal (UE) 800 illustrated according to an example. For instance, the terminal 800 may be a mobile phone, a computer, a digital broadcasting user equipment, a messaging transceiving device, a game console, a tablet device, a medical device, a fitness device, a personal digital assistant, etc.

With reference to FIG. 12, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the terminal 800, such as operations associated with display, telephone calls, data communication, camera operations, and recording operations. The processing component 802 may include one or more processors 820 to execute instructions to complete all or part of steps of the above method. In addition, the processing component 802 may include one or more modules to facilitate interaction between the processing component 802 and other components. For instance, the processing component 802 may include a multimedia module to facilitate interaction between the multimedia component 808 and the processing component 802.

The memory 804 is configured to store various types of data to support operations on the terminal 800. Instances of these data include instructions for any application program or method operating on the terminal 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides power to various components of the terminal 800. The power supply component 806 may include a power management system, one or more power supplies, and other components associated with generation, management, and distribution of the power for the terminal 800.

The multimedia component 808 includes a screen that provides an output interface between the terminal 800 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, wipe, and gestures on the touch panel. The touch sensor may sense a boundary of a touch or wipe action, and also may detect a duration and pressure related to the touch or wipe operation. In some examples, the multimedia component 808 includes a front camera and/or a rear camera. When the terminal 800 is in an operation mode, such as a shooting mode or a video mode, the front camera and/or the rear camera may receive external multimedia data. Each front camera and rear camera may be a fixed optical lens system or have focal length and optical zoom capabilities.

The audio component 810 is configured to output and/or input audio signals. For instance, the audio component 810 includes a microphone (MIC). When the terminal 800 is in the operation mode, such as a call mode, a recording mode, and a voice recognition mode, the microphone is configured to receive external audio signals. The received audio signals may be further stored in the memory 804 or sent via the communication component 816. In some examples, the audio component 810 further includes a speaker for outputting the audio signals.

The I/O interface 812 provides an interface between the processing component 802 and a peripheral interface module. The above peripheral interface module may be a keyboard, a click wheel, buttons, etc. These buttons may include but are not limited to: a home button, a volume button, a start button, and a lock button.

The sensor component 814 includes one or more sensors to provide the terminal 800 with various aspects of status assessment. For instance, the sensor component 814 may detect an on/off status of the terminal 800 and relative positioning of a component. For instance, the component is a display and a keypad of the terminal 800. The sensor component 814 may also detect a position change of the terminal 800 or a component of the terminal 800, presence or absence of contact between the user and the terminal 800, orientation or acceleration/deceleration of the terminal 800, and a temperature change of the terminal 800. The sensor component 814 may include a proximity sensor configured to detect presence of a nearby object when there is no physical contact. The sensor component 814 may also include a light sensor, such as a CMOS or CCD image sensor, for use in imaging applications. In some examples, the sensor component 814 may also include an acceleration sensor, a gyroscope sensor, a magnetic sensor, a pressure sensor or a temperature sensor.

The communication component 816 is configured to facilitate wired or wireless communication between the terminal 800 and other devices. The terminal 800 may access a wireless network based on a communication standard, such as WiFi, 2G or 3G, or their combination. In an example, the communication component 816 receives a broadcast signal or broadcast related information from an external broadcast management system via a broadcast channel. In an example, the communication component 816 further includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology and other technologies.

In an example, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, so as to execute the above method.

In an example, a non-transitory computer readable storage medium including instructions is further provided, for instance, the memory 804 including instructions. The above instructions may be executed by the processor 820 of the terminal 800 to complete the above method. For instance, the non-transitory computer readable storage medium may be an ROM, a random access memory (RAM), a CD-ROM, a magnetic tape, a floppy disk, an optical data storage device, etc.

Figure 13:
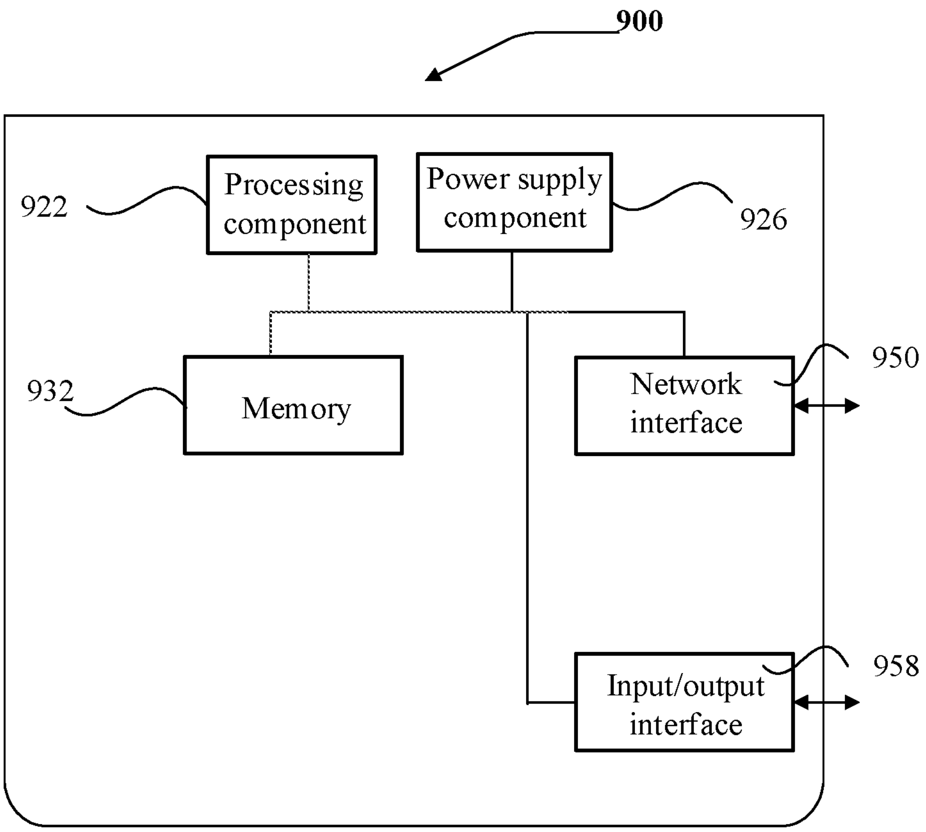
FIG. 13 is a schematic structural diagram of a base station illustrated according to an example.

As shown in FIG. 13, an example of the disclosure illustrates a structure of a base station. For instance, the base station 900 may be provided as a network-side device. Referring to FIG. 13, the base station 900 includes a processing component 922, which further includes one or more processors, as well as a memory resource represented by a memory 932 configured to store instructions executable by the processing component 922, for instance, an application program. The application program stored in the memory 932 may include one or more modules each corresponding to one set of instructions. In addition, the processing component 922 is configured to execute the instructions to execute any of the aforesaid method applied to the base station, for instance, the method shown in FIG. 4A to FIG. 8B.

The base station 900 may further include a power supply component 926 configured to execute power management of the base station 900, a wired or wireless network interface 950 configured to connect the base station 900 to a network, and an input/output (I/O) interface 958. The base station 900 may operate an operating system stored in the memory 932, for instance, Windows Server™, Mac OS X™, Unix™, Linux™, FreeBSD™ or the like.

According to the technical solutions provided by the examples of the application, in response to entering the RRC disconnected state such as the RRC idle state or the RRC inactive state, the UE in the RRC disconnected state is triggered to perform the positioning measurement through the first paging message carrying the positioning request message, so that the UE in the RRC disconnected state can complete the positioning measurement. Compared to switching the UE in the RRC disconnected state to the RRC connected state and then reporting the positioning result, delay of the positioning measurement may be located, and a speed of the positioning measurement may be improved.

After considering the specification and practicing the disclosure disclosed herein, those of skill in the art will easily think of other implementation solutions of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are to be regarded as illustrative merely.

It may be understood that the disclosure is not limited to the precise structure that has been described above and shown in the accompanying drawings, and various modifications and changes can be made without departing from the scope of the disclosure. The scope of the disclosure is merely limited by the appended claims.

What is claimed is:

1. An information processing method, comprising:

in response to receiving a positioning request message, broadcasting, by a first base station anchored by user equipment (UE), a first paging message carrying the positioning request message, wherein the UE is in a Radio Resource Control (RRC) disconnected state, and the positioning request message is configured to request a positioning result of the UE.

2. The method according to claim 1, further comprising:

receiving, by the first base station, the positioning result reported by the UE based on the first paging message in a random access procedure; and sending, by the first base station, the positioning result of the UE.

3. The method according to claim 1, further comprising:

in response to determining that the UE is in the RRC disconnected state, sending, by the first base station, triggering information to a second base station in a Radio Access Network based Notification Area (RNA) of the UE, wherein the triggering information comprises: the first paging message, or the positioning request message and a second paging message not carrying the positioning request message, wherein the second paging message is configured to trigger the second base station to send the first paging message to the UE; and the first paging message is configured to trigger the UE to perform positioning measurement and obtain the positioning result to be reported to a location management function (LMF).

4. The method according to claim 3, wherein sending the triggering information to the second base station in the RNA of the UE comprises:

sending the triggering information to the second base station in the RNA of the UE through an Xn interface between base stations.

5. The method according to claim 1, wherein the positioning request message further comprises: positioning configuration for performing positioning measurement by the UE, wherein the positioning configuration is configured to indicate at least one of following configurations:

a positioning measurement manner;

a measurement parameter of positioning;

a positioning quality of service (Qos) request; or identifier information of the UE performing the positioning measurement.

6. The method according to claim 5, wherein the first paging message carries the positioning configuration.

7. The method according to claim 6, wherein the first paging message comprises at least one of followings:

a first IE, carrying positioning indication information that indicates the UE to perform the positioning measurement;

or a second IE, carrying the positioning configuration.

8. The method according to claim 1, further comprising:

sending, by the first base station, a request message configured to request positioning assistance information, wherein the positioning assistance information comprises at least one of following information: a cell identifier of positioning measurement, a base station identifier of the positioning measurement, or resource location information of a positioning reference signal of the positioning measurement.

9. The method according to claim 2, wherein receiving the positioning result reported by the UE based on the first paging message in the random access procedure comprises:

receiving the positioning result reported by the UE based on the first paging message through a message A of a 2-step random access procedure;

or receiving the positioning result reported by the UE based on the first paging message through a message 3 or a message 5 of a 4-step random access procedure.

10. An information processing method, comprising:

receiving, by a second base station in a Radio Access Network based Notification Area (RNA) of user equipment (UE), triggering information sent by a first base station, wherein the second base station is different from the first base station anchored by the UE, the triggering information comprises: a first paging message carrying a positioning request message of a location management function (LMF), or the positioning request message and a second paging message not carrying the positioning request message; and broadcasting, by the second base station, the first paging message based on the triggering information, wherein the first paging message is configured to trigger the UE to perform positioning measurement and obtain a positioning result to be reported to the LMF.

11. The method according to claim 10, further comprising:

receiving, by the second base station, the positioning result reported by the UE based on the first paging message in a random access procedure; and reporting, by the second base station, the positioning result directly to the LMF or reporting the same to the LMF through the first base station.

12. The method according to claim 10, wherein the positioning request message further comprises: positioning configuration for performing the positioning measurement by the UE, wherein the positioning configuration is configured to indicate at least one of following configurations:

a positioning measurement manner;

a measurement parameter of positioning;

a positioning quality of service (Qos) request; or identifier information of the UE performing the positioning measurement.

13. The method according to claim 12, wherein the first paging message carries the positioning configuration.

14. The method according to claim 13, wherein the first paging message comprises at least one of followings:

a first IE, carrying positioning indication information that indicates the UE to perform the positioning measurement;

or a second IE, carrying the positioning configuration.

15. The method according to claim 10, further comprising:

sending, by the second base station, a request message for obtaining positioning assistance information to the LMF or the first base station, wherein the positioning assistance information comprises at least one of following information: a cell identifier of the positioning measurement, a base station identifier of the positioning measurement, or resource location information of a positioning reference signal of the positioning measurement.

16. The method according to claim 11, wherein receiving the positioning result reported by the UE based on the first paging message in the random access procedure comprises:

receiving the positioning result reported by the UE based on the first paging message through a message A of a 2-step random access procedure;

or receiving the positioning result reported by the UE based on the first paging message through a message 3 or a message 5 of a 4-step random access procedure.

17. An information processing method, comprising:

in response to receiving a first paging message carrying a positioning request message, performing, by user equipment (UE), positioning measurement, wherein the first paging message is broadcasted by a first base station anchored by the UE in response to receiving the positioning request message, the UE is in a Radio Resource Control (RRC) disconnected state, and the positioning request message is configured to request a positioning result of the positioning measurement of the UE; and reporting, by the UE, the positioning result of the positioning measurement.

18. The method according to claim 17, wherein the first paging message further carries positioning configuration; and wherein in response to receiving the first paging message carrying the positioning request message, performing the positioning measurement comprises:

performing, in response to receiving the first paging message carrying the positioning request message, the positioning measurement according to the positioning configuration.

19. The method according to claim 18, wherein the positioning configuration is configured to indicate at least one of following configurations:

a positioning measurement manner;

a measurement parameter of positioning;

a positioning quality of service (Qos) request; or identifier information of the UE performing the positioning measurement.

20. The method according to claim 17, wherein reporting the positioning result of the positioning measurement comprises:

reporting the positioning result based on the first paging message through a message A of a 2-step random access procedure;

or reporting the positioning result based on the first paging message through a message 3 or a message 5 of a 4-step random access procedure.

* * * * *